US006230546B1

(12) United States Patent
Wilstermann et al.

(10) Patent No.: US 6,230,546 B1
(45) Date of Patent: May 15, 2001

(54) METHOD AND APPARATUS FOR DETECTING COMBUSTION KNOCK FROM THE IONIC CURRENT IN AN INTERNAL COMBUSTION ENGINE

(75) Inventors: Hartung Wilstermann, Gaildorf; Peter Hohner, Echterdingen; Peter Bertelshofer, Zirndorf; Juergen Schenk, Albershausen, all of (DE)

(73) Assignees: Temic Telefunken microelectronic GmbH, Heilbronn; DaimlerChrysler AG, Stuttgart, both of (DE)

( * ) Notice: Subject to any disclaimer, the term of this patent is extended or adjusted under 35 U.S.C. 154(b) by 0 days.

(21) Appl. No.: 09/211,460

(22) Filed: Dec. 14, 1998

(30) Foreign Application Priority Data

Dec. 12, 1997 (DE) .............................. 197 55 257

(51) Int. Cl.⁷ .................................... G01L 23/22

(52) U.S. Cl. .......................... 73/35.08; 123/425

(58) Field of Search .................... 73/116, 117.3, 73/35.01, 35.03, 35.04, 35.05, 35.06, 35.07, 35.08

(56) References Cited

U.S. PATENT DOCUMENTS

| 4,337,642 | * | 7/1982 | Yoshida ...................... 73/35 |
| 4,444,172 | * | 4/1984 | Sellmaier et al. .............. 123/425 |
| 4,478,068 | * | 10/1984 | Bonitz et al. ................... 73/35 |
| 4,565,087 | * | 1/1986 | Damson et al. ................... 73/35 |
| 4,716,874 | * | 1/1988 | Hilliard et al. .............. 123/425 |
| 5,040,510 | * | 8/1991 | Krebs et al. .................... 73/35 |
| 5,220,821 | * | 6/1993 | Moser et al. ................... 73/35 |
| 5,263,452 | | 11/1993 | Ohsawa et al. . |
| 5,305,722 | | 4/1994 | Fukui . |
| 5,836,285 | * | 11/1998 | Aoki et al. .................. 123/425 |

FOREIGN PATENT DOCUMENTS

| 3027103 | | 1/1981 | (DE) . |
| 3128027 | | 2/1983 | (DE) . |
| 3137016 | | 3/1983 | (DE) . |
| 3319458 | | 11/1984 | (DE) . |
| 3415948 | | 10/1985 | (DE) . |
| WO89 11087 | | 11/1989 | (DE) . |
| 4239592 | | 5/1993 | (DE) . |
| 4321782 | | 1/1994 | (DE) . |
| 19618989 | | 11/1996 | (DE) . |
| 0399068 | | 11/1990 | (EP) . |
| 2259365 | * | 8/1992 | (GB) ............................ G01L/23/22 |
| 2259365 | | 3/1993 | (GB) . |

* cited by examiner

*Primary Examiner*—Max Noori
*Assistant Examiner*—Maurice Stevens
(74) *Attorney, Agent, or Firm*—W. F. Fasse; W. G. Fasse

(57) ABSTRACT

A method and an apparatus for detecting knocking combustion in an internal combustion engine, by evaluating the ionic current signal sensed in the combustion chamber, is especially adapted to correct or compensate the ionic current signal for longterm variations arising therein, for example due to variations in the composition of the fuel as a result of contamination with metallic components or the like. Thereby, erroneous knock recognition is prevented. To achieve this, a frequency-filtered time-sampled knocking component integral of the ionic current signal generated in the present combustion cycle is multiplied by a correction value determined from at least one integral value of the ionic current signal generated during at least one prior combustion cycle. The correction value is preferably a time-weighted combination of plural difference values that are respectively determined by subtracting an average integrated value of the ionic current signal from the knocking component integral of the ionic current signal in plural prior combustion cycles, and that are stored in successive positions of a shift register. If the final corrected knocking component integral falls outside of an allowable range, a knock recognition signal is released.

18 Claims, 2 Drawing Sheets

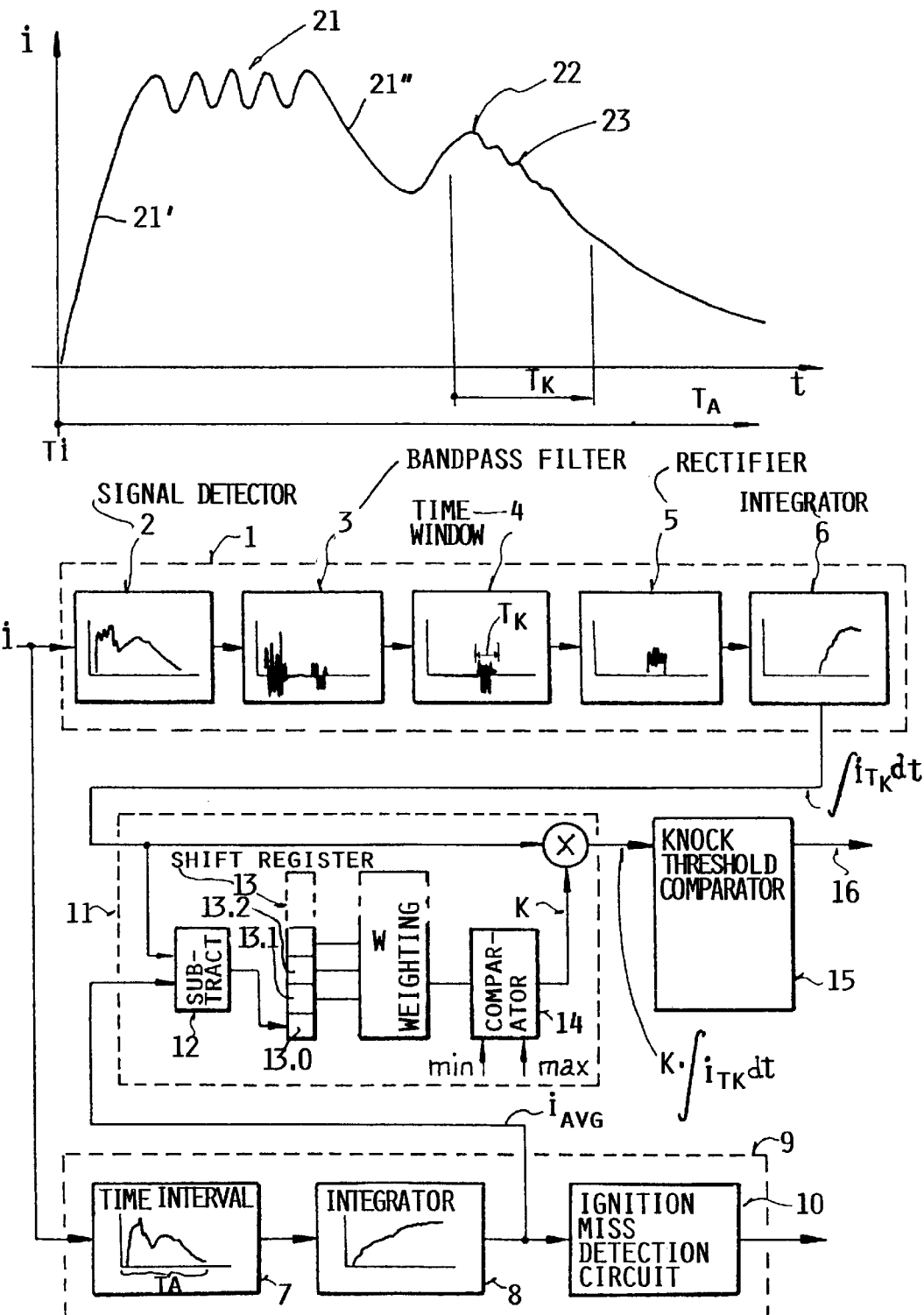

METHOD AND APPARATUS FOR DETECTING COMBUSTION KNOCK FROM THE IONIC CURRENT IN AN INTERNAL COMBUSTION ENGINE

CROSS-REFERENCE TO RELATED APPLICATION

This application is related to the copending U.S. application Ser. No. 09/211,458, filed on Dec. 14, 1998 by overlapping inventors with the present application.

PRIORITY CLAIM

This application is based on and claims the priority under 35 U.S.C. §119 of German Patent Application 197 55 257.9, filed on Dec. 12, 1997, the entire disclosure of which is incorporated herein by reference.

FIELD OF THE INVENTION

The invention relates to a method and an apparatus for detecting knocking during combustion in an internal combustion engine by evaluating an ionic current signal and electronically adjusting the ignition timing.

BACKGROUND INFORMATION

In the normal combustion of a fuel-air mixture in an internal combustion engine, the fuel-air mixture is ignited by an ignition spark and then burns in a controlled and progressive manner as the flame front advances through the compressed fuel-air mixture in the cylinder chamber. However, an undesired auto-ignition and uncontrolled explosion of the as-yet un-burned fuel-air mixture, commonly known as "knocking", "pinging", or "detonation", can also occur. Such knocking is generally to be avoided because it causes intense pressure waves oscillating in the cylinder, which cause a vibration of the engine components and a resultant audible knocking noise. Ultimately, the intense knocking forces can damage or destroy the engine. Nonetheless, under at least some operating conditions, an engine can achieve its maximum power output and efficiency by operating directly at the limit or boundary of knocking conditions. Thus, an engine controller, such as the conventionally known electronic control unit (ECU), aims to operate the engine as close as possible to the knocking limit without actually causing knocking. If knocking does occur, then corrective measures are taken, for example the ignition timing is slowly retarded, i.e. adjusted in a direction toward the top dead-center position of the piston.

Knocking combustion is generally characterized by pressure oscillations having a frequency in the range from 5 to 20 kHz, taking place in a time interval following the maximum cylinder pressure, i.e. maximum compression. The knocking combustion can be detected by measuring and evaluating changes in the ionic current that flows within the cylinder combustion chamber. This ionic current can be sensed by a suitable sensor arranged in the cylinder, for example a spark plug may be used as an ionic current sensor. However, the ionic current signal already exhibits a first maximum signal level as well as oscillations of the ionic current at the time when the flame front advances and spreads through the fuel-air mixture in the cylinder. This maximum signal level and oscillations in the ionic current can be misevaluated to result in an erroneous detection of knocking when knocking has not actually occurred, because these signal oscillations are caused by turbulence in the cylinder and not by knocking.

Knock recognition methods using an evaluation of the ionic current signal are known in the prior art, but all suffer the disadvantage that they are very sensitive to interference and often result in false detections of knocking. A major cause of such problems in the prior art is that variations in the composition of the fuel, and especially with regard to any metallic components in the fuel, have a strong influence on the ionic current signal over time. Also, the overall signal level or amplitude of the ionic current signal is substantially increased or even multiplied several times, if even a relatively small amount of heavy metal impurities or other metallic components are present in the fuel. This can occur, for example, due to a contaminated production of the fuel or due to accidental fueling of the engine with leaded fuel. Since these variations in the fuel and resulting variations in the ionic current signal are not taken into account according to the prior art, the known methods and circuit arrangements can erroneously determine that knocking is occurring even when a proper combustion without knocking is actually taking place.

SUMMARY OF THE INVENTION

In view of the above it is an object of the invention to provide a method and a circuit arrangement for detecting and recognizing a knocking combustion condition by evaluating the ionic current signal, which effectively compensates for any variations in the fuel composition over time. The invention further aims to avoid or overcome the disadvantages of the prior art, and to achieve additional advantages, as apparent from the present description.

The above objects have been achieved in a method for detecting and recognizing a knocking combustion in an internal combustion engine, according to the invention, with the following features. During each combustion cycle in the engine, an ionic current is sensed in the combustion chamber to provide an ionic current signal, which is then detected during a specified time window, filtered through a band-pass filter, and integrated to provide a present integral value relating to the present combustion cycle. Variations in the ionic current signal, such as those caused by variations in the fuel composition, are compensated or corrected by applying a correction value derived from at least one prior integral value that was determined during a combustion cycle preceding the present combustion cycle in which the present integral value was determined. The resulting corrected present integral value is compared to a knocking threshold value, and if the corrected present integral value exceeds the knocking threshold value, then an output signal is released indicating that a knocking combustion has been detected. The correction of the signal can take place either before or after any one of the steps of time window sampling, band-pass filtering, and integrating the signal.

A key feature of the invention is that the correction value is derived from at least one of the preceding integral values of the ionic current signal, i.e. integral values that were determined in prior combustion cycles. This correction or compensation concept takes advantage of the fact that a change in the ionic current signal caused by a variation in the composition of the fuel takes place in a uniform stepwise manner over relatively long periods of time, i.e. over the course of many successive combustion cycles. This is generally the case when contaminated fuel or any fuel having a different composition is added to the fuel tank of the internal combustion engine, because the added fuel having a different composition first mixes with the previous fuel remaining in the fuel tank, while the previous fuel composition remaining in the fuel line is drawn to the engine. Then, the newly established mixed fuel composition will be drawn through the fuel line to the engine and remain substantially the same for a long period of time, i.e. until other fuel is added to the fuel tank and a new mixed fuel composition is established.

In view of the above, the time constant associated with a variation of the ionic current due to the change in fuel composition is many times slower, i.e. longer in duration, than the time constant associated with influences on the ionic current caused by knocking combustion. As a result, it is possible to account for and compensate the long time constant variations resulting from fuel composition variations, using a correction value derived from at least one prior integral value of the ionic current signal determined during a preceding combustion cycle. It is especially advantageous if the correction factor is derived from a time-weighted plurality of several prior integral values. In this manner, the slow variation of the ionic current signal over several combustion cycles can be compensated for, by "looking back" to the signal levels during plural preceding cycles.

According to a further feature of the invention, an integral mean value or average value is determined by integrating the prior ionic current signal without band-pass filtering, over a time interval that is longer than the time window specified for recognition of knocking. This integral average value is subtracted from the at least one prior integral value for determining the correction factor. In this manner it is possible to minimize a deviation of the integral value as a result of other short-duration variations of the ionic signal, for example resulting from ignition spark failures or "misses", or resulting from knocking that takes place before the determination and application of the correction factor. Thus, the correction factor is based solely on the long-duration shift of the signal level of the ionic current signal as a result of long-duration variations, such as the variations resulting from a change in the composition of the fuel supply.

As mentioned above, the correction factor can already be applied to the ionic current signal before the integration step. This helps to avoid the occurrence of a numerical overflow in the arithmetic logic circuitry while carrying out the numerical integration of the ionic current signal, which would be increased above normal levels due to the fuel composition influences. Accordingly, the knock recognition errors resulting due to such overflow conditions are also avoided. Since the ionic current signal is evaluated and compensated on the basis of the prior weighted integral values before carrying out the integration of the present ionic current signal, the integration is thus carried out on a "cleaned up" or corrected signal.

The invention further provides that the correction is preferably always only carried out at a certain prescribed point or operating condition during the operation of the internal combustion engine. In this manner, it is possible to avoid the extra cost and complexity involved in storing a matrix or data table of characterizing parameters that would otherwise be necessary for taking into account the particular dependence of the ionic current signal on the various possible operating conditions of the engine. In this context, it is preferable to select an operating point of the engine that typically arises very frequently.

As a further feature, the correction factor is compared with an acceptable correction factor range, to ensure that the corrected ionic current signal does not deviate too far from real expected values, and that rapid and extreme variations are not too strongly taken into consideration or over-compensated, whereby a knocking condition might possibly not be recognized.

BRIEF DESCRIPTION OF THE DRAWINGS

In order that the invention may be clearly understood, it will now be described in connection with example embodiments, with reference to the accompanying drawings, wherein:

FIG. 1 is a schematic diagram showing an uncorrected, unfiltered ionic current signal over time during a combustion cycle, as well as a time window pertinent to the detection of knocking, and a time interval used for determining an average integral value;

FIG. 2 is a schematic block circuit diagram of a first circuit arrangement for carrying out the method according to the invention, with a subsequent correction of the integral value.

Figure 3:
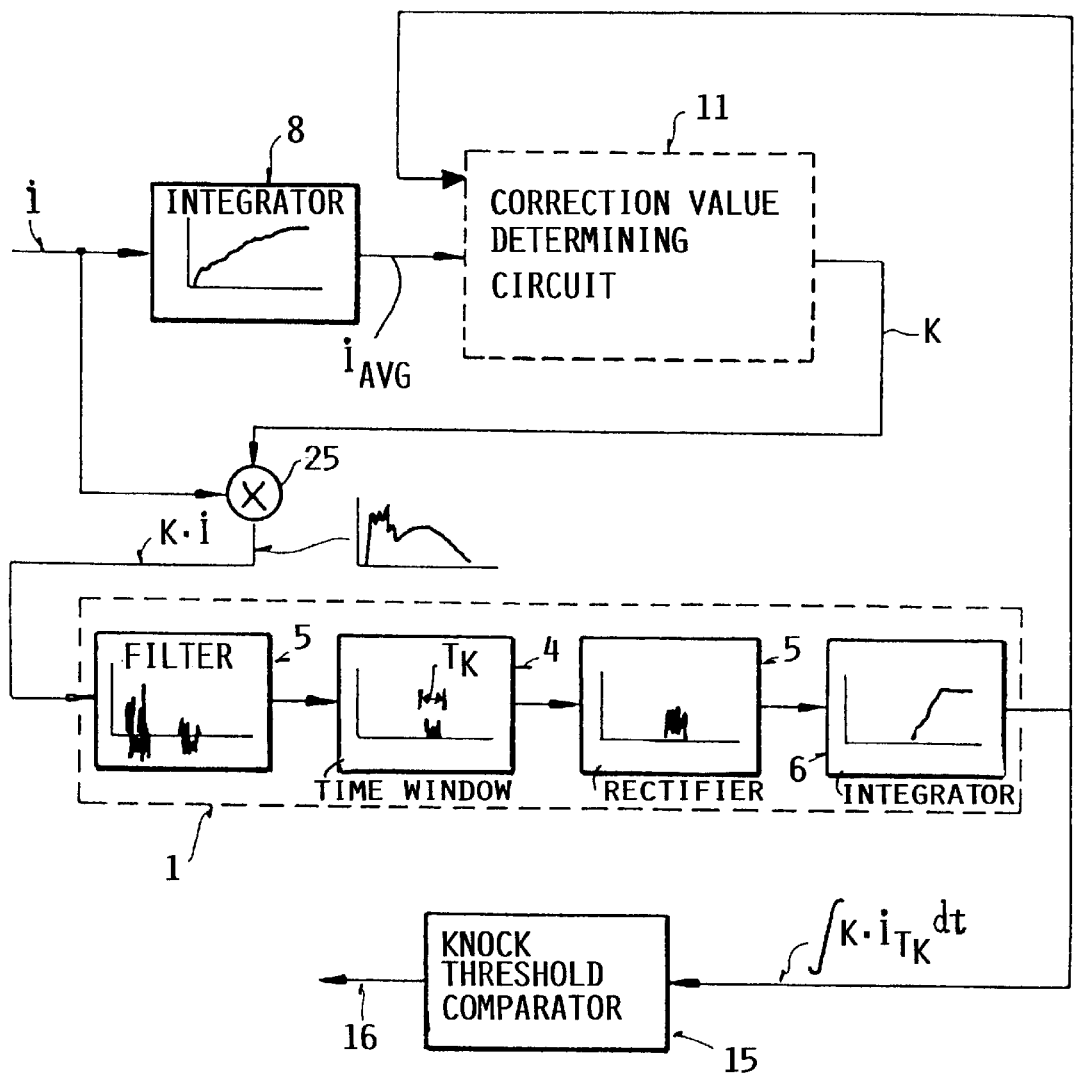
FIG. 3 is a schematic block circuit diagram of a second circuit arrangement for carrying out the method according to the invention, with an initial correction of the ionic current signal before the integration.

DETAILED DESCRIPTION OF PREFERRED EXAMPLE EMBODIMENTS AND OF THE BEST MODE OF THE INVENTION

FIG. 1 shows the time progress of the ionic current signal i during a single combustion cycle in a cylinder of an internal combustion engine. It should be understood that the present method and apparatus can be respectively used in connection with any one or more of the cylinders in an engine. After the time of ignition Ti, the flame front expands through the combustion chamber and causes a sharp increase 21' in the ionic current signal i up to the primary signal maximum 21. The signal level at the primary maximum 21 may exhibit oscillations due to turbulence and the like as the flame front progresses through the combustion chamber.

Thereafter, the signal level of the ionic current signal i drops off slightly at 21", and then the signal level again increases up to a secondary local maximum 22 at the point of maximum pressure or compression during the combustion cycle. In the case of combustion without knocking, the amplitude or signal level of the ionic current signal i will smoothly decrease after the secondary local maximum 22. However, in the case of knocking combustion, a characteristic knocking oscillation 23 will be superimposed on the decay of the signal level after the secondary local maximum 22. This characteristic knocking oscillation 23 can be detected for recognizing the knocking.

Accordingly, a time window TK for knock recognition is selected to encompass the time period in which the knocking oscillation 23 occurs, without detecting other portions of the ionic current signal curve. For example, a detection of the sharp increase 21' or the oscillations at the primary maximum 21 in the signal level would lead to an erroneous knocking recognition.

A change in the composition of the fuel, for example due to contamination of the fuel with heavy metal components, can lead to a sharp deviation of the entire ionic current signal from the nominally expected signal i. In such a case, the signal level can be increased by a multiple, without completely losing the typical characteristic signal curve over time as shown in FIG. 1. Such a corruption or change of the ionic current signal due to variations in the fuel composition can be corrected or compensated by using a correction value according to the invention. This correction value or correction factor is derived from a prior integral value of the ionic current signal that was determined during a prior combustion cycle before the respective present combustion cycle for which the present integral value is to be determined.

The above mentioned compensation or correction method can be carried out using a circuit according to a first embodiment as will now be described in connection with FIG. 2. This circuit embodiment is particularly for carrying out a subsequent correction after the integration is carried out for providing the present integral value. As shown in FIG. 2, the ionic current signal i is first provided to a knocking signal preprocessing circuit 1. This circuit 1 comprises an ionic current signal detector 2, a band-pass filter 3 tuned to pass the frequency range of the ionic current signal i that is significant for detecting the knocking, i.e. the expected knocking frequencies, a time window circuit 4 for sampling the signal continuously during the knocking time window TK, a rectifier 5, and an integrator 6. Preferably in this embodiment, the above mentioned circuit elements 2, 3, 4, 5 and 6 are connected in series in the order mentioned. The respective integral value $\int i_{TK}$ dt of the ionic current signal i that has been filtered for the knocking frequencies and time sampled for the knocking time window is made available after each combustion cycle at the output of the integrator 6.

Simultaneously, the ionic current average value $i_{AVG}$ is determined. An ignition "miss" or spark failure recognition circuit 9 as shown in FIG. 2 can be used to achieve this. As is usually necessary for determining an ionic current average value, the ionic current signal i is detected in an ionic current signal detector 7 over a time interval TA that is longer than the knocking time window TK, and is then integrated in an integrator 8, to provide a total integrated ionic current value, which can be treated as an average value, or can be normalized by a time factor to provide an ionic current integrated average value $i_{AVG}$. This average value is then provided to an ignition miss recognition circuit 10 as well as to a correction value determining circuit 11.

The correction value determining circuit 11 includes a subtraction element 12 that forms the difference between the as-yet uncorrected present integral value $\int i_{TK}$ dt and the ionic current average value $i_{AVG}$. As is apparent from FIG. 2, the integral value $\int i_{TK}$ dt relates to the present combustion cycle, of which the ionic current signal i has been band-pass filtered, time window sampled and integrated, while the ionic current average value $i_{AVG}$ also relates to the present combustion cycle. The difference value determined by the substraction element 12 is stored in register position 13.0 of a shift register 13. Before storing the difference value in position 13.0, the stored value in each of the shift register positions was respectively shifted to the next higher position. Thus, the present difference value relating to the present combustion cycle is stored in the register position 13.0 and is not used for carrying out the correction value determination until a later combustion cycle.

The values stored in the register positions 13.1, 13.2, . . . 13.n are the corresponding difference values determined by the subtraction element 12 during preceding combustion and evaluation cycles. These prior difference values stored in the register positions 13.1, 13.2, . . . 13.n respectively represent the prior integral values $\int i_{TK}$ dt with the respective prior integral average values $i_{AVG}$ subtracted therefrom.

The prior difference values stored in register positions 13.1, 13.2, . . . 13.n are provided to a weighting function circuit W, which respectively multiplies the prior difference values element-by-element with respective weighting values. Preferably, the weighting values are selected such that the sum of the weighting values is normalized to some unit value, for example 1, and whereby the respective weighting values become ever smaller with increasing time separation from the present time, i.e. the present combustion cycle or evaluation cycle. In other words, the respective weighting values $W_1, W_2, \ldots W_n$ become ever smaller with increasing position in the shift register 13, so that the most recent prior difference value from subtraction element 12 is weighted most heavily, while the difference value furthest in the past is weighted the least. The total number of shift register positions as well as the distribution of the weighting values is to be determined in each individual application, taking into account the requirements at hand and the computational capacity that is available. The correction value or factor K is then determined by arithmetically combining the weighted difference values, for example as a quotient of a standardized value for the integral value and the weighted prior difference values. In order to achieve this, the weighting circuit W comprises the necessary arithmetic logic circuitry.

The correction value or factor K output by the weighting circuit W is provided to a comparator 14 in which it is compared to an acceptable correction range limited by the correction limit values min and max. If the determined correction value K exceeds the maximum threshold max or falls below the minimum threshold min, then an output signal is directly and automatically released to indicate that the combustion should be regarded as a knocking combustion.

On the other hand, if the determined correction value K falls within the acceptable range as determined by the comparator 14, then the integral value $\int i_{TK}$ dt relating to the present combustion cycle is multiplied by the correction value K relating to the prior combustion cycle or cycles, to result in the corrected integral value $K \cdot \int i_{TK}$ dt, which is then provided to the knock threshold comparator 15. This comparator 15 compares the corrected integral value $K \cdot \int i_{TK}$ dt with one or more knocking thresholds and then outputs a corresponding knock recognition signal 16 if it is determined that the corrected integral value is outside of the acceptable range.

FIG. 3 shows another embodiment of a circuit arrangement for carrying out a further variant of the method according to the invention, and particularly for carrying out a correction of the ionic current signal i initially at the input side, i.e. before processing the signal i in the pre-processing circuit 1, rather than thereafter as described above in connection with FIG. 2. As shown in FIG. 3, just as in FIG. 2, the integrator 8 integrates the ionic current signal i over the time interval TA to determine the average integral value $i_{AVG}$, which in turn is provided to the correction value determining circuit 11 which is embodied and operates in the manner described above to determine the present correction value K from the previously stored average integral values $i_{AVG}$ or difference values as described above.

However, in this embodiment, the correction value K is already multiplied with the ionic current signal i in a multiplier 25, before the input side of the knocking signal preprocessing circuit 1. Thus, the already corrected ionic current signal $K \cdot i$ is provided to the input of the knocking signal preprocessing circuit 1, where it is filtered through the band-pass filter 3, sampled or detected during the time window TK by the time window sampling circuit 4, rectified in the rectifier 5, and then integrated in the integrator 6. The resulting integrated corrected value $\int K \cdot i_{TK}$ dt is once again provided to the knocking threshold comparator 15, which compares the input value to at least one knocking threshold value, and accordingly outputs a knock recognition signal 16.

Using the knock recognition signal 16 or the signal provided by the comparator 14 if the correction value is out of the acceptable range, the knocking condition of the engine may simply be indicated to an operator of the engine, or preferably the knocking condition is automatically counteracted in any known manner. For example, the signal 16 may be provided to the electronic control unit (ECU), which correspondingly retards the ignition timing and/or adjusts the fuel-air ratio until the knocking condition is no longer recognized.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. It should further be understood that the circuit elements described herein for carrying out the specified functions and steps according to the invention, can be embodied by any conventional circuit elements and/or software implementations known to persons of ordinary skill in the art for achieving such functions and steps.

What is claimed is:

1. A method of detecting knocking combustion in an internal combustion engine having at least one combustion chamber operating in a succession of combustion cycles, comprising the following steps carried out for a respective present one of said succession of said combustion cycles:
   a) sensing an ionic current in said combustion chamber and providing an ionic current signal corresponding to said ionic current;
   b) processing said ionic current signal by sampling during a time window and filtering through a band-pass filter to provide a filtered sampled knocking signal;
   c) integrating said filtered sampled knocking signal to provide a present cycle integrated knocking value;
   d) generating an intermediate correction value by integrating said ionic current signal;
   e) forming a present cycle correction value from at least one said intermediate correction value that was generated during a prior one of said combustion cycles preceding said respective present combustion cycle;
   f) correcting at least one of said signals in said steps b) and c) by arithmetically combining said at least one of said signals with said present cycle correction value, such that said present cycle integrated knocking value provided in said step c) is a corrected integrated knocking value; and
   g) comparing said corrected integrated knocking value to at least one knocking threshold, and outputting a knock recognition signal if said corrected integrated knocking value exceeds said knocking threshold.

2. The method according to claim 1, wherein said step e) is carried out such that said present cycle correction value is effective for compensating a variation in said ionic current signal over a plurality of said combustion cycles caused by a variation of a fuel composition of a fuel being combusted in said combustion chamber.

3. The method according to claim 1, wherein
   said intermediate correction value comprises an average integrated value,
   said step d) comprises generating said average integrated value by integrating said ionic current signal directly without an intervening step of band-pass filtering said ionic current signal wherein said integrating is carried out over a time interval that is longer than said time window, and
   said step e) comprises subtracting said average integrated value that was generated during said prior one of said combustion cycles from said integrated knocking value that was provided in said step c) in said prior one of said combustion cycles, to form said present cycle correction value.

4. The method according to claim 3, further comprising a step of evaluating said average integrated value in an ignition spark failure evaluation circuit to determine whether an ignition spark failure occurred during said present combustion cycle.

5. The method according to claim 1, wherein said intermediate correction value is derived from said present cycle integrated knocking value, and said step e) comprises forming said present cycle correction value from at least one said integrated knocking value that was generated respectively during said prior one of said combustion cycles.

6. The method according to claim 1, wherein said step e) comprises forming said present cycle correction value from a plurality of said intermediate correction values that were respectively generated during a plurality of prior ones of said combustion cycles preceding said respective present combustion cycle, by respectively weighting said intermediate correction values with respective weighting factors that vary inversely with the amount of time between the respective associated one of said prior combustion cycles and said respective present combustion cycle, and then combining said weighted intermediate correction values to form said present cycle correction value.

7. The method according to claim 6, wherein said combining of said weighted intermediate correction values comprises forming a quotient of a fixed standard value and said weighted intermediate correction values.

8. The method according to claim 7, wherein
   said intermediate correction value comprises an average integrated value,
   said step d) comprises generating said average integrated value by integrating said ionic current signal directly without an intervening step of band-pass filtering said ionic current signal wherein said integrating is carried out over a time interval that is longer than said time window, and
   said step e) comprises subtracting said average integrated value that was generated during said prior one of said combustion cycles from said integrated knocking value that was provided in said step c) in said prior one of said combustion cycles, to form said present cycle correction value.

9. The method according to claim 1, wherein said at least one of said signals recited in said step f) is said present cycle integrated knocking value, and said arithmetic combining comprises multiplying said present cycle integrated knocking with said present cycle correction value to provide said corrected integrated knocking value.

10. The method according to claim 1, wherein said at least one of said signals recited in said step f) is said ionic current signal, and said arithmetic combining comprises multiplying said ionic current signal with said present cycle correction value so that said ionic current signal is thereafter a corrected ionic current signal which is then subjected to said processing in said step b) and said integrating in said step c).

11. The method according to claim 1, wherein said step e) is performed and again repeated in subsequent ones of said combustion cycles only at a prescribed operating point of said internal combustion engine.

12. The method according to claim 1, further comprising, between said steps e) and f), an additional step of comparing said present cycle correction value to an acceptable correction value range, and if said present cycle correction value falls within said acceptable correction value range then carrying out said steps f) and g), and if said present cycle correction value falls outside of said acceptable correction value range then directly outputting said knock recognition signal while bypassing said steps f) and g).

13. The method according to claim 1, further comprising, in a subsequent one of said combustion cycles, a step of receiving a correction suppression signal and responsively thereto suppressing the performance of at least said step f).

14. The method according to claim 1, wherein said time window in said step b) is a time portion of said present combustion cycle during which any knocking combustion is expected to occur, and said band-pass filter in said step b) is tuned to pass only a range of frequencies characteristic of knocking combustion in said engine.

15. A method of detecting knocking combustion in an internal combustion engine having at least one combustion chamber operating in a succession of combustion cycles, comprising the following steps in a respective present one of said combustion cycles:
   a) sensing an ionic current in said combustion chamber and providing an ionic current signal corresponding to said ionic current;
   b) processing said ionic current signal by band-pass filtering during a time window to provide a knocking signal;
   c) integrating said knocking signal to provide an integrated knocking value;
   d) generating an average integrated value, comprising integrating said ionic current signal during a time interval greater than said time window;
   e) subtracting said average integrated value from said integrated knocking value to form an intermediate correction value, and storing said intermediate correction value in a memory;
   f) retrieving from said memory at least one said intermediate correction value that was respectively stored in said memory in at least one previous one of said combustion cycles prior to said respective present one of said combustion cycles, and forming a present correction value from said at least one intermediate correction value;
   g) multiplying said integrated knocking value with said present correction value to provide a corrected integrated knocking value; and
   h) comparing said corrected integrated knocking value to at least one knocking threshold, and outputting a knock recognition signal if said corrected integrated knocking value exceeds said knocking threshold.

16. A method of detecting knocking combustion in an internal combustion engine having at least one combustion chamber operating in a succession of combustion cycles, comprising the following steps in a respective present one of said combustion cycles:
   a) sensing an ionic current in said combustion chamber and providing an ionic current signal corresponding to said ionic current;
   b) generating an average integrated value, comprising integrating said ionic current signal during a time interval;
   c) forming an intermediate correction value from said average integrated value, and storing said intermediate correction value in a memory;
   d) retrieving from said memory at least one said intermediate correction value that was respectively stored in said memory in at least one previous one of said combustion cycles prior to said respective present one of said combustion cycles, and forming a present correction value from said at least one intermediate correction value;
   e) multiplying said ionic current signal by said present correction value to provide a corrected ionic current signal;
   f) processing said corrected ionic current signal by band-pass filtering and integrating during a time window of shorter duration than said time interval to provide a corrected integrated knocking value; and
   g) comparing said corrected integrated knocking value to at least one knocking threshold, and outputting a knock recognition signal if said corrected integrated knocking value exceeds said knocking threshold.

17. A circuit arrangement for carrying out the method of claim 15, comprising:
   an ionic current sensor;
   a pre-processing circuit that includes a first input connected to said ionic current sensor, a first output, and a band-pass filter, a time-windowing circuit, a rectifier and a first integrator connected together in series between said input and said output;
   an average value circuit that includes a second input connected to said ionic current sensor, a second output, and a time interval circuit adapted to sample a signal during a time interval longer than said time-windowing circuit and a second integrator connected together in series between said second input and said second output;
   a correction circuit including a subtraction element with two respective inputs respectively connected to said first output and said second output, a shift register connected to an output of said subtraction element, a weighting circuit that is connected to at least one output of said shift register and that has a weighted output, and a multiplier element that has two respective inputs respectively connected to said first output and said weighted output and that has a corrected output; and
   a comparator connected to said corrected output.

18. A circuit arrangement for carrying out the method of claim 16, comprising:
   an ionic current sensor;
   an average value circuit that includes a first input connected to said ionic current sensor, a first output, and a time interval circuit adapted to sample a signal during a time interval and a first integrator connected together in series between said first input and said first output;
   a correction circuit including a shift register connected at least indirectly to said first output, a weighting circuit that is connected to at least one output of said shift register and that has a weighted output;
   a multiplier element having two respective inputs respectively connected to said ionic current sensor and said weighted output, and having a multiplier output;
   a pre-processing circuit that includes a second input connected to said multiplier output, a second output, and a band-pass filter, a time-windowing circuit, a rectifier and a second integrator connected together in series between said second input and said second output; and
   a comparator connected to said second output.

* * * * *

UNITED STATES PATENT AND TRADEMARK OFFICE
CERTIFICATE OF CORRECTION

PATENT NO. : 6,230,546 B1
DATED : May 15, 2001
INVENTOR(S) : Wilstermann et al.

It is certified that error appears in the above-identified patent and that said Letters Patent is hereby corrected as shown below:

Title page,
Under item [56] References Cited, U.S. PATENT DOCUMENTS

Line 8 should read: 5,263,452  11/1998  Ohsawa et al.

Under FOREIGN PATENT DOCUMENTS

Line 6 should read:   WO89 11087   11/1989   (WIPO).
Line 9, should read:   19618980     11/1996   (DE).

Column 8,
Line 51, after "knocking", insert -- value --.

Signed and Sealed this

Twenty-seventh Day of November, 2001

Attest:

NICHOLAS P. GODICI
Attesting Officer    Acting Director of the United States Patent and Trademark Office